United States Patent Office 3,209,868
Patented Oct. 5, 1965

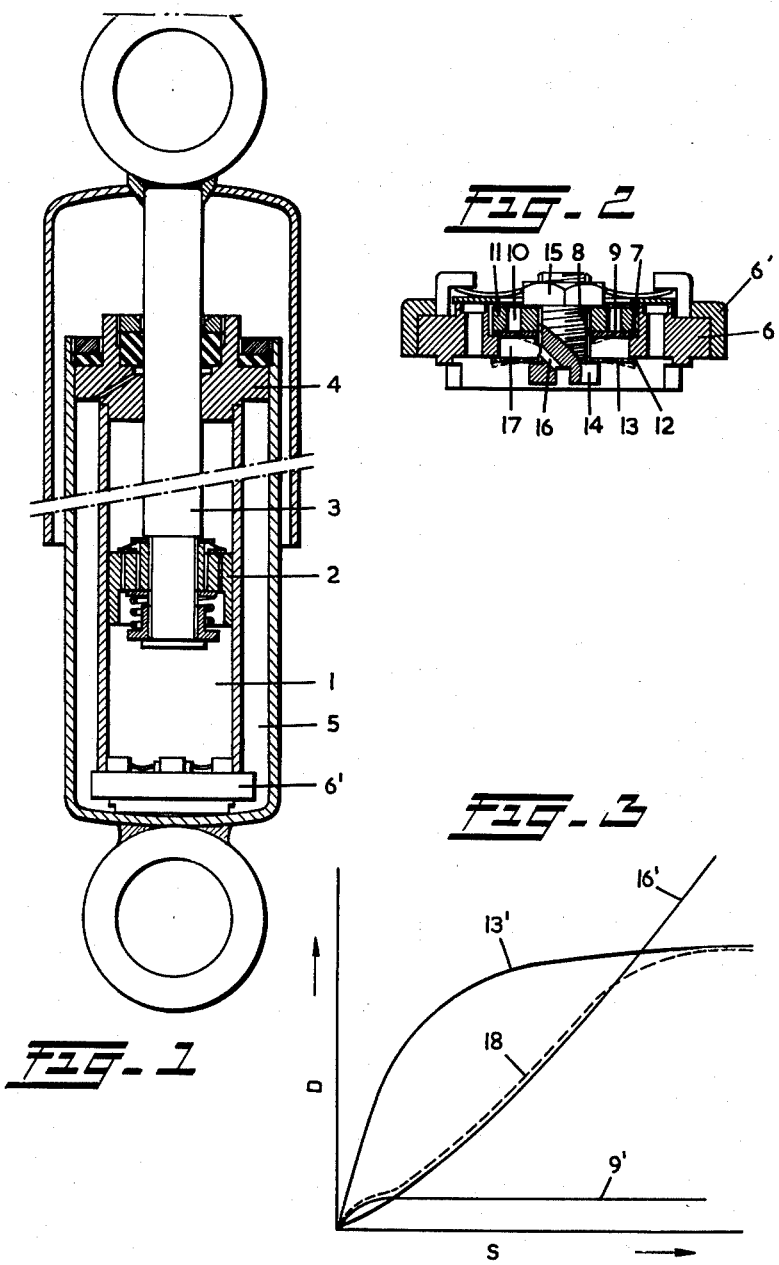

3,209,868
SHOCK DAMPER
Arie Adrianus de Koning, Oostdijk 139, and Kornelis Korstiaan Karel de Koning, Oostdijk 153, both of Oud-Beijerland, Netherlands
Filed Apr. 3, 1963, Ser. No. 270,385
Claims priority, application Netherlands, Apr. 4, 1962, 276,797
11 Claims. (Cl. 188—88)

The present invention relates to a shock damper comprising a cylinder in which a piston including a piston rod is mounted for reciprocating movement and a valve is provided at the cylinder end away from said piston rod through which said cylinder communicates with a reservoir, said valve being arranged upon occurrence of fluid pressure to allow the passage of fluid to a space in communication with said reservoir.

Such a damper is known. In this construction the valve may be formed as a rigid, spring-urged valve, or as a unilaterally mounted, resilient annular valve, or as a resilient plate provided with a central hole with a contacting rigid plate provided with one or a plurality of holes covered by the web of the resilient plate.

Although especially the last-mentioned valve opens very smoothly at the beginning of the inward stroke of the damper, a flexible damper requires, in addition to slight dampening at low piston velocities, a great dampening force at higher piston velocities.

A lightly-set valve will produce a smooth dampening at a low piston velocity but is inadequate for dampening greater forces as a result of a higher piston velocity, whereas when the valve is made heavier it is satisfactory at a high piston velocity but no longer suitable for a smooth dampening at a low piston velocity.

It is accordingly an object of the present invention to provide a valve construction which both gives a smooth dampening at low piston velocities and is effective at higher piston velocities.

To this effect the valve according to the invention is so constructed that the connection with the reservoir is formed by a bore, channel or passage of a given cross-sectional configuration but of limited cross-sectional area, and by a passage in parallel relationship thereto and controlled by a second valve.

During the inward stroke of the piston, the dampening is primarily effected at a low piston velocity through the first-mentioned valve, the dampening medium subsequently passing the bore of limited cross-sectional area.

When the piston velocity is increased the flow through this bore or channel will also produce dampening.

At yet higher piston velocities, since the bore or channel only allows the passage of a limited quantity of fluid, the remaining fluid will pass the passage located parallel to the bore or channel, the valve which controls this passage acting as dampening means.

The invention provides a construction in which, at any piston velocity of the damper, a very smooth dampening is obtained. When the last mentioned valve is also made adjustable it is possible for the dampening power to be adjusted to requirements.

The invention will now be further explained with reference to the drawings, illustrating, by way of example, an embodiment of the invention.

In the drawings,

FIG. 1 is a longitudinal section through a shock damper according to the invention;

FIG. 2 shows a cross-section of the dampening valve on a larger scale, and

FIG. 3 is a diagrammatic representation of the operation of the shock damper.

Referring to FIG. 1, 1 is a cylinder in which a piston 2 with a piston rod 3 can move. The cylinder is at the rod end closed with a rod guide 4, which also acts as a cover for sealing a reservoir 5 surrounding the cylinder 1.

Between the cylinder 1 and the reservoir 5 is provided at the end away from the piston rod a valve housing 6'.

In FIG. 2, the valve housing is provided with a seat 7, upon which lies a resilient plate 9 provided with a central hole 8, with a rigid plate 11 provided with one or more holes 10.

At the underside of the valve housing 6 is provided a second seat 12 for a valve 13.

The plates 9 and 11 together with the valve 13 are kept on their seats by a bolt 14 screwed in the rigid plate 11.

The bolt 14 can be locked by a nut 15.

The bolt 14 also has a bore 16 of limited cross-sectional area, to provide for direct communication of the interspace 17 between the valves 9 and 13 with the reservoir 5. If so desired, this bore may be provided with a valve opening in the direction of the reservoir.

During the inward stroke of the shock damper the entering piston rod volume displaces fluid from the cylinder 1.

As a result of the pressure exerted thereby on the resilient plate 9 via the bores 10, the plate 9 is deformed and allows the passage of fluid through the central aperture 8 to the space 17.

From there the fluid can escape by way of the bore 16 to the reservoir 5.

In the case of excessive supply of dampening fluid as a result of a high piston velocity of the damper, the bore 16 gives too much resistance, as a consequence of which the pressure in the space 17 will rise to such an extent that the valve 13 is opened and allows the passage of fluid to the reservoir 5.

By turning the bolt 14 it is possible for the pretension of the valve 13 to be adjusted.

In FIG. 3, the effect of the shock damper according to the invention is shown diagrammatically, the piston velocity S being plotted along the abscissa, and the dampening force D along the ordinate.

The curves in uninterrupted lines are designated by 9′, 13′ and 16′ and represent the dampening force of the members 9, 13 and 16 in relation to the piston velocity.

The operation of the shock damper as described results in the dash line 18 being followed, in other words, in a smooth dampening at virtually any piston velocity.

It should be noted that it is possible for the bore or channel 16 to be formed, instead of in the bolt 14, in or at the edge of the valve 13.

We claim:

1. A shock damper comprising a cylinder, a piston rod carrying a piston mounted for reciprocal movement in said cylinder, a valve at a free end portion of the cylinder opposite said piston, said valve comprising a pair of spaced deflectable valve members defining therebetween a chamber, a first of said valve members being normally seated on a first valve seat to close fluid communication between said cylinder and said chamber, a second of said valve members being normally seated on a second valve seat to close fluid communication between said chamber and the exterior of said cylinder under conditions of low fluid pressure, passage means at all times maintaining said chamber in fluid communication with the exterior of said cylinder, said valve members being disc valves of a generally annular shape, a radially innermost portion of the first valve member being normally seated on the first valve seat, and a radially outermost portion of the second valve member being normally seated on the second valve seat.

2. A shock damper comprising a cylinder, a piston rod carrying a piston mounted for reciprocal movement in said cylinder, a valve at a free end portion of the cylinder opposite said piston, said valve comprising a pair of spaced deflectable valve members defining therebetween a chamber, a first of said valve members being normally seated on a first valve seat to close fluid communication between said cylinder and said chamber, a second of said valve members being normally seated on a second valve seat to close fluid communication between said chamber and the exterior of said cylinder under conditions of low fluid pressure, passage means at all times maintaining said chamber in fluid communication with the exterior of said cylinder, securing means maintaining the valve members in assembled relationship, and said passage means being located in said securing means.

3. A shock damper comprising a cylinder, a piston rod carrying a piston mounted for reciprocal movement in said cylinder, a valve at a free end portion of the cylinder opposite said piston, said valve comprising a pair of spaced deflectable valve members defining therebetween a chamber, a first of said valve members being normally seated on a first valve seat to close fluid communication between said cylinder and said chamber, a second of said valve members being normally seated on a second valve seat to close fluid communication between said chamber and the exterior of said cylinder under conditions of low fluid pressure, a relatively rigid plate backing said first valve member, at least a single opening in said plate normally closed by said first valve member, a securing device maintaining said valve members and plates in assembled relationship, and a passage in said securing device for at all times maintaining said chambers in fluid communication with the exterior of said cylinder.

4. The shock damper as defined in claim 3 wherein said valve members are disc valves of a generally annular shape, said rigid plate including an opening in generally axially aligned relationship relative to said valve members, said securing device being received through the annular disc valves and the opening in the rigid plate, and means cooperative with said securing device for preloading the same whereby the valves are opened at a predetermined fluid pressure.

5. A valve assembly comprising a housing, a chamber in said housing, said chamber being defined by a pair of spaced annular valve members, a first of said valve members being normally seated on a first valve seat to close fluid communication between one side of the housing and said chamber, a second of said valve members being normally seated on a second valve seat to close fluid communication between said chamber and another side of the housing under conditions of low fluid pressure, means maintaining said valve members in assembled relationship in said housing, said last-mentioned means including a portion surrounded by said pair of annular valve members, and passage means in said portion for at all times maintaining said chamber in fluid communication with said another side of the housing.

6. A valve assembly comprising a housing, a chamber in said housing, said chamber being defined by a pair of spaced annular valve members, a first of said valve members being normally seated on a first valve seat to close fluid communication between one side of the housing and said chamber, a second of said valve members being normally seated on a second valve seat to close fluid communication between said chamber and another side of the housing under conditions of low fluid pressure, means maintaining said valve members in assembled relationship in said housing, and passage means for at all times maintaining said chamber in fluid communication with said another side of the housing, said first valve member having a radially innermost deflectable portion movable away from said first valve seat, and said second valve member having a radially outermost deflectable portion movable away from said second valve seat.

7. A valve assembly comprising a housing, a chamber in said housing, said chamber being defined by a pair of spaced annular resilient deflectable valve members, a first of said valve members being normally seated on a first valve seat to close fluid communication between one side of the housing and said chamber, a second of said valve members being normally seated on a second valve seat to close fluid communication between said chamber and another side of the housing under conditions of low fluid pressure, means maintaining said valve members in assembled relationship in said housing, said last-mentioned means including a portion surrounded by said pair of annular valve members, and passage means in said portion for at all times maintaining said chamber in fluid communication with said another side of the housing and adjusting means for adjustably preloading the deflectable first and second valve members.

8. A valve assembly comprising a housing, a chamber in said housing, said chamber being defined by a pair of spaced annular valve members, a first of said valve members being normally seated on a first valve seat to close fluid communication between one side of the housing and said chamber, a second of said valve members being normally seated on a second valve seat to close fluid communication between said chamber and another side of the housing under conditions of low fluid pressure, passage means for at all times maintaining said chamber in fluid communication with said another side of the housing, a rigid plate backing the first valve member, a portion of said plate cooperating with a portion of said housing to secure a radially outermost portion of the first valve member therebetween, an opening in said plate normally closed by said first valve member, and means securing said valve members and said plate in assembled relationship in said housing.

9. The valve assembly as defined in claim 8 wherein said last mentioned means is a securing device received through said annular valve members and the opening in said plate, and said passage means is a port in said securing device.

10. The valve assembly as defined in claim 9 wherein the first valve member includes a radially innermost deflectable portion normally seated upon but removable away from said first valve seat toward said chamber, and said second valve member includes a radially outermost deflectable portion normally seated upon said second valve seat and movable at a predetermined fluid pressure away from said chamber to said other side of the housing.

11. The valve assembly as defined in claim 10 and further including means for preloading the first and second valve members and means for adjusting the preloading of the first and second valve members to regulate the opening of said valve members at predetermined fluid pressure.

References Cited by the Examiner

UNITED STATES PATENTS

| 2,239,112 | 4/41 | Nickelsen | 188—88 |
| 2,653,682 | 9/53 | Whisler et al. | 188—100 |
| 2,695,079 | 11/54 | Brundrett | 267—8 X |
| 2,699,844 | 1/55 | McIntyre | 188—88 |
| 2,740,500 | 4/56 | Brundrett et al. | 188—88 |

FOREIGN PATENTS

| 228,281 | 5/60 | Australia. |
| 699,949 | 11/52 | Great Britain. |

MILTON BUCHLER, *Primary Examiner.*

EUGENE G. BOTZ, *Examiner.*